(12) United States Patent
Schoeny et al.

(10) Patent No.: US 11,849,659 B2
(45) Date of Patent: Dec. 26, 2023

(54) DRAFT LOAD CONTROL SYSTEM FOR AN AGRICULTURAL IMPLEMENT

(71) Applicant: CNH Industrial America LLC, New Holland, PA (US)

(72) Inventors: Christopher Schoeny, Yorkville, IL (US); Trevor Stanhope, Palos Hills, IL (US)

(73) Assignee: CNH Industrial America LLC, New Holland, PA (US)

( * ) Notice: Subject to any disclaimer, the term of this patent is extended or adjusted under 35 U.S.C. 154(b) by 1162 days.

(21) Appl. No.: 16/196,636

(22) Filed: Nov. 20, 2018

(65) Prior Publication Data
US 2020/0154626 A1 May 21, 2020

(51) Int. Cl.
| | | |
|---|---|---|
| *A01B 63/11* | (2006.01) | |
| *A01B 63/112* | (2006.01) | |
| *G01B 21/32* | (2006.01) | |
| *A01B 79/00* | (2006.01) | |

(52) U.S. Cl.
CPC .......... *A01B 63/112* (2013.01); *A01B 79/005* (2013.01); *G01B 21/32* (2013.01)

(58) Field of Classification Search
CPC ... A01B 63/008; A01B 63/112; A01B 79/005; A01C 5/068; A01C 7/205
See application file for complete search history.

(56) References Cited

U.S. PATENT DOCUMENTS

| | | | |
|---|---|---|---|
| 6,701,857 B1 | 3/2004 | Jensen et al. | |
| 6,827,029 B1 | 12/2004 | Wendte | |
| 7,721,813 B2 * | 5/2010 | Hou | A01B 63/112 172/7 |
| 7,954,556 B2 * | 6/2011 | Hou | A01B 63/112 172/7 |
| 8,078,367 B2 | 12/2011 | Sauder et al. | |
| 8,275,525 B2 * | 9/2012 | Kowalchuk | A01C 7/205 701/50 |
| 8,561,472 B2 | 10/2013 | Sauder et al. | |
| 8,573,319 B1 * | 11/2013 | Casper | A01B 63/114 172/4 |
| 8,577,561 B2 * | 11/2013 | Green | A01C 7/205 701/50 |

(Continued)

FOREIGN PATENT DOCUMENTS

WO 2017040533 A1 3/2017

OTHER PUBLICATIONS

Ajay Sharda et al.; "Planter Downforce Technology for Uniform Seeding Depth"; K-State Research and Extension, Mar. 1, 2017 (8 pages).

*Primary Examiner* — Gary S Hartmann
(74) *Attorney, Agent, or Firm* — Rebecca Henkel; Rickard Demille

(57) ABSTRACT

A draft load control system for an agricultural implement includes a row unit, a down force system configured to apply a force within or to the row unit, a draft load sensor disposed on the row unit and configured to generate a sensor signal indicative of a draft load on the row unit, and a controller that includes a memory and a processor. The controller is configured to receive the sensor signal from the draft load sensor indicative of the draft load on the row unit, and in response to the draft load exceeding a threshold range, perform a control operation, a monitoring operation, or both.

20 Claims, 4 Drawing Sheets

(56) References Cited

U.S. PATENT DOCUMENTS

| | | | |
|---|---|---|---|
| 8,700,270 B2 * | 4/2014 | Foster | A01B 63/145 701/50 |
| 8,763,713 B2 * | 7/2014 | Bassett | A01C 5/06 172/2 |
| 8,849,521 B2 * | 9/2014 | Ishikawa | A01B 63/112 701/50 |
| 8,862,339 B2 * | 10/2014 | Henry | A01C 5/062 701/50 |
| 8,909,440 B2 * | 12/2014 | Ishikawa | A01B 63/112 701/50 |
| 8,910,582 B2 | 12/2014 | Mariman et al. | |
| 8,985,232 B2 * | 3/2015 | Bassett | A01B 63/24 172/2 |
| 9,113,589 B2 * | 8/2015 | Bassett | A01C 5/064 |
| 9,198,343 B2 * | 12/2015 | Mariman | A01C 7/203 |
| 9,288,937 B2 * | 3/2016 | Sauder | A01B 13/08 |
| 9,699,951 B2 * | 7/2017 | Dienst | A01C 7/208 |
| 9,826,677 B2 | 11/2017 | Gervais et al. | |
| 9,848,523 B2 | 12/2017 | Sauder et al. | |
| 9,943,029 B2 | 4/2018 | Burk et al. | |
| 9,968,030 B2 * | 5/2018 | Kowalchuk | A01C 7/205 |
| 10,117,377 B2 * | 11/2018 | Dienst | A01C 21/002 |
| 10,178,823 B2 * | 1/2019 | Kovach | A01B 63/114 |
| 10,334,771 B2 * | 7/2019 | Dienst | A01B 63/22 |
| 10,779,456 B2 * | 9/2020 | Kowalchuk | A01B 63/008 |
| 10,820,470 B2 | 11/2020 | Wu | F15B 13/0417 |
| 10,834,863 B2 * | 11/2020 | Sauder | A01B 13/08 |
| 10,918,005 B2 * | 2/2021 | Steinlage | A01B 63/112 |
| 2011/0184551 A1 | 7/2011 | Kowalchuk | |
| 2011/0313575 A1 | 12/2011 | Kowalchuk et al. | |
| 2013/0032362 A1 | 2/2013 | Rylander | |
| 2015/0020612 A1 | 1/2015 | Witt et al. | |
| 2015/0289436 A1 * | 10/2015 | Singh | B60D 1/141 172/7 |
| 2018/0042171 A1 | 2/2018 | Maro | |
| 2018/0092287 A1 | 4/2018 | Gamer et al. | |
| 2019/0183036 A1 * | 6/2019 | Leimkuehler | A01C 7/205 |
| 2019/0254223 A1 * | 8/2019 | Eichhorn | A01C 7/203 |

* cited by examiner

US 11,849,659 B2

DRAFT LOAD CONTROL SYSTEM FOR AN AGRICULTURAL IMPLEMENT

BACKGROUND

The disclosure relates generally to a draft load control system for an agricultural implement.

Generally, agricultural implements are towed behind a work vehicle, such as a tractor. The agricultural implements generally contain a particulate material, such as seeds, fertilizer, and/or other agricultural product, which is distributed on or in the ground using various methods. For example, certain implements form a trench in the ground, deposit a seed in the trench, and then close the trench over the seed. Proper closure of the trench may enhance seed germination and crop production. In some instances, the trench may not properly close due to soil conditions, rocks, residue buildup, and other impediments.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a draft load control system for an agricultural implement includes a row unit, a down force system configured to apply a force within or to the row unit, a draft load sensor disposed on the row unit and configured to generate a sensor signal indicative of a draft load on the row unit, and a controller that includes a memory and a processor. The controller is configured to receive the sensor signal from the draft load sensor indicative of the draft load on the row unit, and in response to the draft load exceeding a threshold range, perform a control operation, a monitoring operation, or both.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
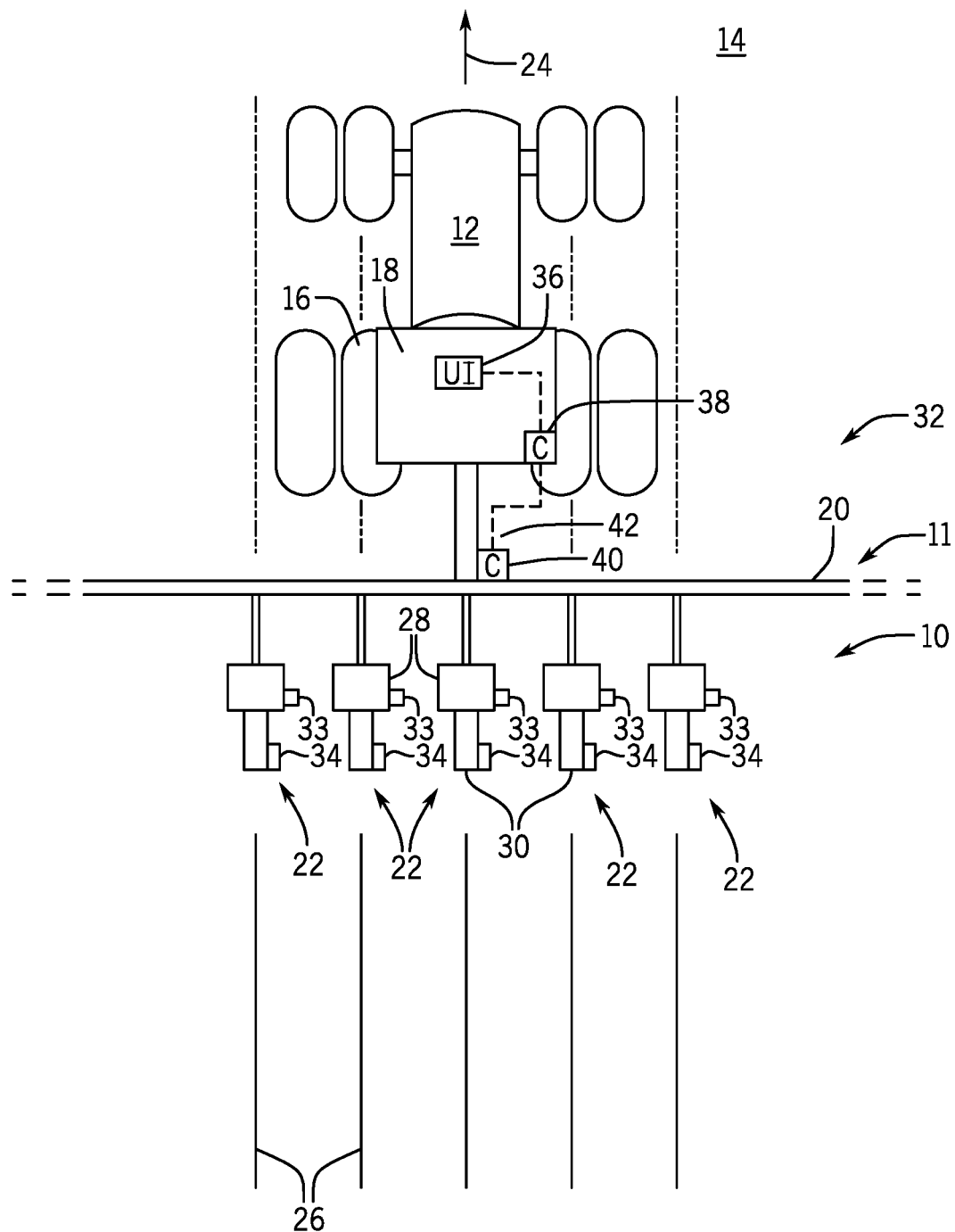
FIG. 1 is a top view of an embodiment of a work vehicle and an agricultural implement disposed in a field and having a draft load control system, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain embodiments of the present disclosure include a draft load control system for an agricultural implement and/or a work vehicle. Certain agricultural implements are towed by a work vehicle and are configured to open a trench in a field, deposit agricultural product (e.g., seed, fertilizer, etc.), and close the trench. For example, certain agricultural implements include row units that form trenches along rows of the field, deposit the agricultural product in the trenches, and close the trenches. Certain agricultural implements and/or row units of the agricultural implements include a draft load sensor that detects a draft load on the row unit or on a ground engaging component of the row unit (e.g., opening disk(s) or closing disk(s)). The draft load sensor outputs a sensor signal indicative of a draft load to a controller of the draft load control system. In response to the draft load exceeding a threshold range, the controller performs a control operation and/or a monitoring operation. The control operation may include outputting a control signal to a down force system of the row unit indicative of instructions to adjust (e.g., increase and/or decrease) a down force applied to an opening system and/or a closing system of the row unit. The monitoring operation may include notifying (e.g., providing a user-detectable indication) a user of the draft load exceeding the threshold range.

In certain embodiments, the draft load control system may include additional sensors (e.g., a soil moisture sensor, an orientation sensor, etc.) and may perform the control operation and/or the monitoring operation based on signals (e.g., signals indicative of a moisture of the soil, an orientation of the row unit or of a component of the row unit, etc.) received from the additional sensors in combination with or in place of the signal indicative of the draft load. The orientation of may include a position, a depth, and/or an angular position of the row unit or of the component of the row unit with respect to the surface of the field 14 or with respect to other portions of the row unit 22. The threshold range of the draft load may depend on certain conditions (e.g., soil conditions and properties, weather, a type of the agricultural product applied by the agricultural implement 11, environmental conditions, and other conditions), the soil moisture sensed by the soil moisture sensor, the orientation sensed by the orientation sensor, or a combination thereof. The measurements and loads (e.g., the draft load, the soil moisture, and the orientation) measured by the sensors may provide an indication of closing system performance, soil properties, soil-to-seed contact, and other soil mechanics. For example, a spike in the draft load experienced at the closing system (e.g., the draft load exceeding the threshold range) may indicate that a closing disk of the closing system is not turning properly and/or a rock or piece of soil is lodged within the closing system that prevents the closing disk from turning. As such, the adjustments to the force applied by the down force system and/or the notification to the user may enable improved soil mechanics as the agricultural implement is operated in the field.

With the foregoing in mind, the present embodiments relating to a draft load control system may be utilized in any suitable agricultural implement and/or work vehicle. For example, FIG. 1 is a top view of an embodiment of a draft load control system 10 of an agricultural implement 11 and a work vehicle 12. As illustrated, the agricultural implement 11 is coupled to the work vehicle 12. The agricultural implement 11 and the work vehicle 12 are disposed in a field 14. The work vehicle 12 includes drive wheels 16 that rotate to move the work vehicle 12 through the field 14. In certain embodiments, the work vehicle 12 may include other travel mechanisms (i.e., a track system) to move the work vehicle 12. The work vehicle 12 also includes a cab 18 that houses an operator of the agricultural implement 11 and the work vehicle 12. For example, the operator may be positioned in the cab 18 while the work vehicle 12 moves through the field 14. The agricultural implement 11 includes a frame 20 coupled to row units 22. As illustrated, the work vehicle 12 is coupled to the frame 20. As such, the work vehicle 12 may tow the agricultural implement 11, via the frame 20, through the field 14 in a direction 24.

Each row unit 22 is configured to form a row 26 in the field 14 (i.e., a trench, furrow, cut, and/or opening in a seedbed) as the agricultural implement 11 is towed through the field 14. For example, each row unit 22 includes an opening system 28 that penetrates the soil of the field 14 to form the row 26. After forming the row 26, an agricultural product (e.g., seed, fertilizer, etc.) may be delivered to the soil by each respective row unit 22 to the rows 26 (i.e., into the trench). For example, the agricultural product may include seeds that mature into a harvestable crop. After delivery of the agricultural product to the row 26, a closing system 30 of each respective row unit 22 displaces soil into the row 26 and over the seeds. The closing system 30 may partially or completely fill the row 26 with the soil.

As illustrated, the draft load control system 10 and each row unit 22 includes an opening system draft load sensor 33 disposed on the opening system 28 and a closing system draft load sensor 34 disposed on the closing system 30. As the row units 22 travel across the field 14, each row unit 22 may experience a draft load generally parallel to the direction of travel (e.g., the direction 24). The opening system draft load sensor 33 and/or the closing system draft load sensor 34 may detect a draft load on the row unit 22 (e.g., at the opening system 28 and at the closing system 30, respectively) and may output sensor signals indicative of the draft load to a controller of the draft load control system 10. For example, the sensors 33 and 34 may be strain gauges that may detect the draft load.

In certain embodiments, each row unit 22 may include a down force system that applies a down force to the opening system 28 and/or to the closing system 30. For example, the down force system may include an actuator (e.g., a pressure cylinder) that applies the down force to the opening system 28 and/or an actuator that applies a down force to the closing system 30. In certain embodiments, the down force applied by the actuator may correspond to a target depth of the opening system 28 or of the closing system 30. As such, the down force system may be controlled to achieve a target depth. The down force applied by the down force system may affect the draft load on the row unit 22. For example, a greater down force applied by the down force system may cause the row unit 22 to experience a greater draft load. Additionally, the greater down force may cause the closing system 30 to better close the trench formed row unit 22. As described in greater detail below, the down force system may be controlled by the draft load control system based on the draft load experienced at the opening system and/or at the closing system, among other factors.

The work vehicle 12 includes a user interface 36 and a work vehicle controller 38. As illustrated, the user interface 36 and the work vehicle controller 38 are disposed in the cab 18 of the work vehicle 12. In certain embodiments, the user interface 36 and/or the work vehicle controller 38 may be disposed remotely from the work vehicle 12. The work vehicle controller 38 may control certain operations of the work vehicle 12 and/or of the draft load control system 10. The agricultural implement 11 includes an agricultural implement controller 40. The agricultural implement controller 40 may control certain operations of the agricultural implement 11 and/or of the draft load control system 10. In certain embodiments, one or more of the row units 22 may include row unit controllers that control certain operations of the row units 22 and/or the draft load control system 10. The operator disposed in the cab 18 or disposed remotely may interact with the user interface 36 to control the draft load control system 10, the agricultural implement 11, the work vehicle 12, or a combination thereof. For example, the user interface 36 may display values indicative of the draft load at each row unit 22 and/or may display selectable options for operating modes of the draft load control system 10.

As illustrated, the user interface 36, the work vehicle controller 38, and the agricultural implement controller 40 are connected via a network 42. The network 42 may include a wired connection (e.g., Ethernet, universal serial bus (USB), CANbus, ISObus, other suitable wired connections, or a combination thereof) and/or a wireless connection (e.g., Wi-Fi, Bluetooth, other suitable wireless connections, or a combination thereof) between the user interface 36, the work vehicle controller 38, the agricultural implement controller 40, other components of the draft load control system 10, or a combination thereof. Further, the network 42 may include one or more connections on different transport protocols. As such, the network 42 enables the user interface 36, the work vehicle controller 38, the agricultural implement controller 40, the other components of the draft load control system 10, or the combination thereof, to communicate via wired and/or wireless signals.

The work vehicle controller 38 and/or the agricultural implement controller 40 may receive the signals indicative of the draft load as output by the sensors 33 and 34. In certain embodiments, the signals output by the sensors 33 and 34 may pass through and/or be processed by the respective row unit controllers prior to being received by the work vehicle controller 38 and/or the agricultural implement controller 40. For example, a respective row unit controller may receive signals from a respective opening system draft load sensor 33 and/or a respective closing system draft load sensor 34, may process the signals through a filter, and may output signals indicative of the draft load to the work vehicle controller 38 or the agricultural implement controller 40. Based on the draft load, the work vehicle controller 38 or the agricultural implement controller 40 may output a signal to the user interface 36 to notify the operator of the draft load. Additionally, based on the draft load, the work vehicle controller 38 or the agricultural implement controller 40 may output a signal to the respective row unit 22 indicative of adjustment to the force applied to the opening system 28 and/or closing system 30 of the respective row unit 22 (e.g., an adjustment to the force applied by the down force system). In certain embodiments, the opening system draft load sensor 33 or the closing system draft load sensor 34 may be omitted from the draft load control system 10.

In certain embodiments, the agricultural implement 11 may be controlled by sections (e.g., the row units 22 may be divided into groups or sections). The draft load control system 10 may control the sections (e.g., control the down force applied by the down force systems of each row unit 22 within the sections) based on sensed draft loads at the respective sections. For example, based on a detected draft load by the sensor 33 or 34 at an individual row unit 22, the draft load control system 10 may perform a control operation (e.g., adjust the down force applied by the down force system) at each row unit 22 of the section to which the individual row unit 22 belongs. Additionally, the user may be notified of which section of the agricultural implement 11 to which the individual row unit 22 belongs.

As described herein, the draft load control system 10 may compare the sensed draft load to a threshold range and may perform control operation(s) and/or monitoring operation(s) based on the draft load exceeding the threshold range. An example control operation may include adjusting the down force applied by the down force system to the opening system 28 and/or to the closing system 30. An example monitoring operation may include notifying the user (e.g., the operator) of the agricultural implement 11 the draft load and/or of the draft load exceeding the threshold range. The threshold range may be based on operator inputs, inputs determined by the controller, inputs sensed by sensors of the draft load control system 10, or a combination thereof. Such inputs may include an orientation of the row unit 22 or of the ground engaging component of the row unit 22, soil moisture, other soil conditions and properties, weather, a type of the agricultural product applied by the agricultural implement 11, environmental conditions, and other conditions. The draft load on the row unit 22 may provide an indication of closing system performance, soil properties, soil-to-seed contact, and other soil mechanics. As such, the user may be notified of such indications and/or the draft load control system 10 may automatically take corrective action to improve the closing system performance, the soil-to-seed contact, and the other soil mechanics, which may result in increased retention of the agricultural product within the soil, increased harvestable crops, and other benefits. For purposes of discussion, reference may be made to a longitudinal axis or direction 44 parallel to the direction 24 of travel of the agricultural implement 11, a vertical axis or direction 45, and a lateral axis or direction 46.

Figure 2:
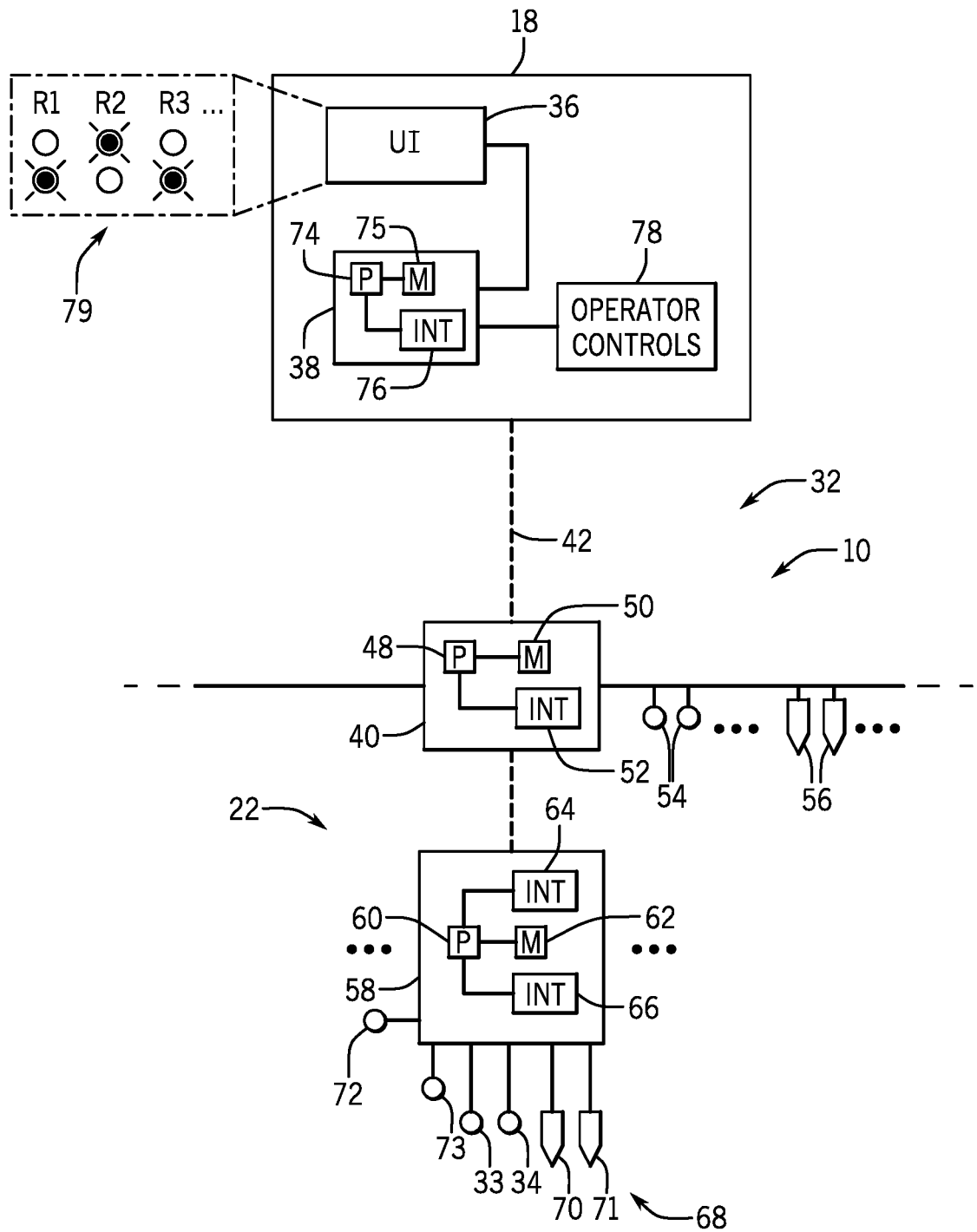
FIG. 2 is a schematic view of the draft load control system of FIG. 1, in accordance with an aspect of the present disclosure.

FIG. 2 is a schematic view of the draft load control system 10 of FIG. 1. As illustrated, the draft load control system 10 includes the work vehicle controller 38 disposed generally in the cab 18 of the work vehicle and the agricultural implement controller 40 of the agricultural implement 11. The agricultural implement controller 40 includes a processor 48, a memory 50, and an interface 52. The agricultural implement controller 40 is configured to control operations and measure parameters of the agricultural implement 11. For example, the agricultural implement controller 40 may receive signals from implement sensors 54 at the processor 48 and via the interface 52. The implement sensors 54 may include sensors that detect various parameters associated with operation of the implement 11. For example, the implement sensors 54 may detect a tire pressure, a down force on a component of a row unit, and other parameters associated with the operation of the agricultural implement 11. Such measured parameters may be stored in the memory 50.

The agricultural implement controller 40 may also output signals to implement actuators 56 via the processor 48 and the interface 52. The implement actuators 56 may include actuators that modify aspects of certain components of the agricultural implement 11. For example, the implement actuators 56 may adjust positions of certain implement components, a tire pressure, and other parameters associated with the operation of the agricultural implement 11. In certain embodiments, the processor 48 may execute instructions stored in the memory 50 to output signals to the implement actuators 56. The signals output to the implement actuators 56 may be in response to the signals received from the implement sensors 54.

As illustrated, the draft load control system 10 includes a row unit controller 58 at the row unit 22 of the agricultural implement 11. The agricultural implement 11 may include a respective row unit controller 58 at some or all of the row units 58. The row unit controller 58 includes a processor 60, a memory 62, a first interface 64, and a second interface 66. The row unit controller 58 is configured to control operations and/or measure parameters of the row unit 22. For example, as illustrated, the row unit controller 58 is coupled to the opening system draft load sensor 33, the closing system draft load sensor 34, and a down force system 68. Additionally, as illustrated, the down force system 68 includes an opening system actuator 70 and a closing system actuator 71. As described herein, the sensors 33 and 34 are configured to detect certain parameters associated with the row unit 22. For example, the sensors 33 and 34 may detect the draft load on the row unit 22. The sensors 33 and 34 may output signals to the row unit controller 58 indicative of the draft load. The signals output by the sensors 33 and 34 may be received by the processor 60 via the second interface 66. In response, the processor 60 may output signals to the work vehicle controller 38 and/or the agricultural implement controller 40 via the first interface 64. In certain embodiments, the measurements detected by the sensors 33 and 34 may be stored in the memory 62 of the row unit controller 58. In some embodiments, the row unit controllers 58 of each row unit 22 may communicate with one another (e.g., may send signals indicative of respective draft load at each row unit 22), and/or the draft load control system 10 may perform the control operation and/or the monitoring operation at certain row units 22 based on the sensor signals and measurements at other row units 22.

The down force system 68, via the opening system actuator 70 and the closing system actuator 71, may apply down force(s) to the opening system and the closing system, respectively, of the row unit 22. As such, the down force system 68 may apply the force(s) within or to the row unit 22. In certain embodiments, the row unit 22 may include additional actuators that adjust a spacing/gap between closing disks of the closing system, a down force applied to the press wheel, and other parameters associated with the operation of the row unit 22. In certain embodiments, the additional actuators may adjust certain aspects of the row unit 22 based on the signals received from the sensors 33 and 34.

Further, as illustrated, the draft load control system 10 includes a soil moisture sensor 72 and an orientation sensor 73. The soil moisture sensor 72 may sense a moisture of the soil and output a sensor signal indicative of the moisture to the controller (e.g., the work vehicle controller 38, the implement controller 40, the row unit controller 58) of the draft load control system 10. The soil may be engaged by the ground engaging component (e.g., opening disk(s), closing disk(s), etc.) experiencing the draft load as measured by the draft load sensor (e.g., the opening system draft load sensor 33, the closing system draft load sensor 34, etc.). The orientation sensor 73 may sense an orientation of the row unit 22 or of the ground engaging component of the row unit 22 and output a sensor signal indicative of the orientation to the controller of the draft load control system 10. The orientation may include a lateral position of the row unit 22 or of the grounding engaging component, a depth of the ground engaging component with respect to the surface of the field 14, an angular position of the row unit 22 or of the grounding engaging component, or a combination thereof. Further, the orientation may be the orientation of the ground engaging component experiencing the draft load.

The controller may use the soil moisture and/or the orientation information, in combination with, or without, the draft loads detected by the sensors 33 and/or 44, to perform a control operation (e.g., adjust the down force applied by the down force system) and/or to perform a monitoring operation (e.g., inform the user of the soil moisture and/or the orientation). As described herein, the soil moisture and/or the orientation information may also be used to determine the threshold range of the draft load. The controller may compare the soil moisture to a threshold moisture range, and/or the controller may compare the orientation to a threshold orientation range and may perform the control operation and/or the monitoring operation based on the comparison(s). The threshold moisture range and/or the threshold orientation range may depend on soil properties, a type of agricultural product, and other factors. Additionally, in certain embodiments, the row unit 22 may include other sensors that detect properties associated with the operation of the row unit 22.

As illustrated, the work vehicle controller 38 includes a processor 74, a memory 75, and an interface 76. The work vehicle controller 38 is configured to control certain parameters associated with the operation of the draft load control system 10 and/or the work vehicle. For example, the work vehicle controller 38 may receive signals from the agricultural implement controller 40 and/or the row unit controller 58 indicative of the draft load on the row unit 22 and may receive other parameters associated with the operation of the agricultural implement 11 and/or the work vehicle 12. Such signals may be received at the processor 74 via the interface 76. In certain embodiments, the work vehicle controller 38 may receive signals directly from the sensors 33 and 34 and/or output signals directly to the down force system 68. The parameters indicated by the signals and received by the work vehicle controller 38 may be stored in the memory 75.

Based on the signals received from the sensor 34, any controller of the work vehicle controller 38, the agricultural implement controller 40, or the row unit controller 58 may determine an indication to be displayed on the user interface 36 and/or may determine a control operation. By way of example, the controller may receive the signal indicative of the draft load on the row unit 22. Based on the received signal, the controller may determine whether the draft load exceeds the threshold range. The threshold range may be established by the operator or may be determined by the controller based on certain conditions (e.g., the orientation of the ground engaging component, soil conditions and properties, weather, a type of the agricultural product applied by the agricultural implement 11, environmental conditions, and other conditions). By way of example, as the depth of the ground engaging component (e.g., the opening disks or the closing disks) increases, the draft load on the ground engaging component may be expected to increase. As such, the threshold range of the draft load may increase based on the increased depth of the ground engaging component. In certain embodiments, the operator may input some or all of the conditions to the user interface 36, and the controller may determine the threshold range based on some or all of the operator inputs (e.g., the conditions). Based on the comparison, the controller may output a monitoring signal to perform a monitoring operation (e.g., inform the user of the draft load and/or of the draft load exceeding the threshold range at the particular row unit) and/or may output a control signal to perform a control operation (e.g., adjust the down force applied by the down force system at the row unit).

In the illustrated embodiment, the work vehicle controller 38 is communicatively coupled to the user interface 36 and operator controls 78. The user interface 36 may display certain parameters measured by the draft load control system 10 and/or certain determinations made by the draft load control system 10. For example, as illustrated, the user interface 36 includes visual indicators 79 that may be detectable by a user (e.g., the operator). The visual indicators 79 show whether the draft load exceeds the threshold range at individual row units 22. Each row formed by the row units 22 and in the field corresponds to a set of two visual indicators (e.g., R1, R2, R3, etc.). Each set includes two visual indicators 79 that indicate whether the draft load is within the threshold range. For example, a first visual indicator 79 of the set R1 indicates that the draft load is within the threshold range, and a second visual indicator 79 of the set R1 indicates that the draft load exceeds the threshold range at the respective row unit 22. In certain embodiments, the user interface 36 may include other user-detectable indicators, in addition to or instead of the visual indicators 79, indicative of the draft load at each respective row unit 22 and/or at the sections of the row units 22. For example, the user interface 36 may include a bar graph that displays individual bars representing each row unit 22 and the draft load at each row unit 22. Each bar may be color-coded such that certain colors communicate the draft load (i.e., a red bar may indicate a draft load that exceeds the threshold range). The user interface 36 may include a map drawn in real time that indicates the rows formed by each row unit 22 and may indicate to the operator when a draft load exceeds the threshold range. Further, the user interface 36 may include certain alerts (e.g., a pop-up window) that indicate a draft load exceeding the threshold range. In certain embodiments, the work vehicle controller 38 or the agricultural implement controller 40 may include the user interface 36.

The operator controls 78 may include certain mechanisms that enable the operator to adjust parameters of the agricultural implement 11 and individual row units 22. For example, after viewing the visual indicators 79 and/or the other user-detectable indicators, the operator may make an adjustment to an individual row unit 22 based on the visual indicators 79. Such an adjustment may include adjusting the depth of the opening system 28 via the opening system actuator 70 of the down force system 68, adjusting the depth of the closing system 30 via the closing system actuator 71 of the down force system 68, adjusting the pressure applied via the closing system actuator 71, among other parameters associated with the operation of the row unit 22. In certain embodiments, the work vehicle controller 38 may output signals indicative of such adjustments based on the operator inputs received at the operator controls 78. In some embodiments, the operator controls 78 may be included within the user interface 36.

As described above, the draft load control system 10 includes a processor (e.g., the processor 48, the processor 60, and the processor 74) and a memory (e.g., the memory 50, the memory 62, and the memory 75). In some embodiments, each memory may include one or more tangible, non-transitory, computer-readable media that store instructions executable by the corresponding processor and/or data to be processed by the corresponding processor. Each memory may include random access memory (RAM), read-only memory (ROM), rewritable non-volatile memory (e.g., flash memory), hard drives, optical discs, or a combination thereof. The processors may include general-purpose microprocessors, one or more application specific integrated circuits (ASICs), one or more field programmable gate arrays (FPGAs), or a combination thereof.

Figure 3:
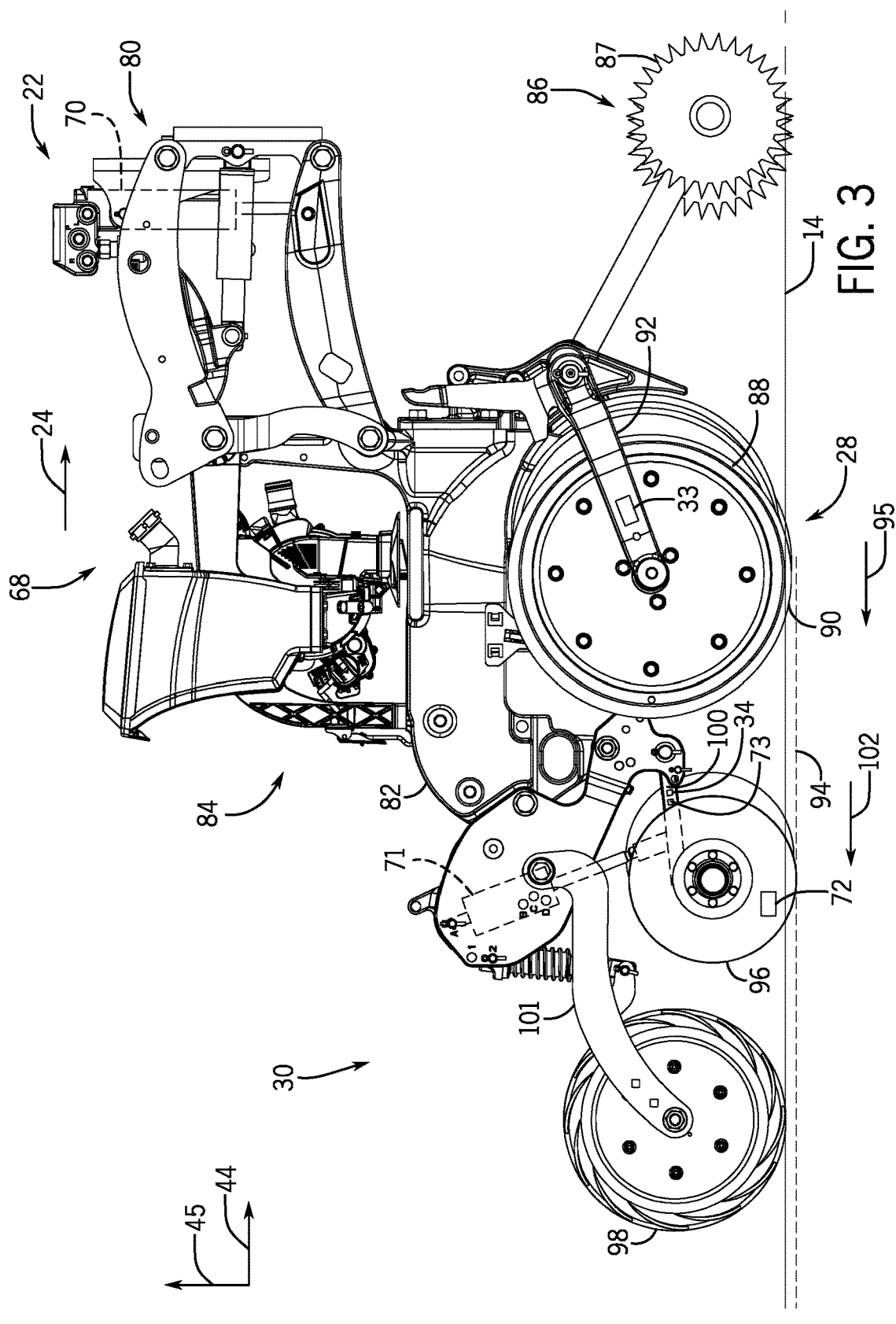
FIG. 3 is a side view of a row unit of the agricultural implement of FIG. 1, in accordance with an aspect of the present disclosure.

FIG. 3 is a side view of the row unit 22 of the agricultural implement 11 of FIG. 1. As illustrated, the row unit 22 includes a linkage assembly 80 that couples a chassis 82 of the row unit 22 to the frame of the agricultural implement. As the agricultural implement is towed through the field 14, the row unit 22 is also towed through the field 14. The row unit 22 is configured to deposit the agricultural product (e.g., the seeds, the fertilizer, etc.) into the field 14. For example, the row unit 22 includes the agricultural product delivery system 84. The agricultural product delivery system 84 stores the agricultural product for deposition by the row unit 22. In certain embodiments, multiple row units 22 may share an agricultural product delivery system. The agricultural product delivery system 84 may include a metering system that meters the agricultural product in a predetermined fashion. For example, the metering system may include a vacuum, a mechanical metering wheel, other metering mechanisms, or a combination thereof.

As illustrated, the row unit 22 includes a residue management system 86 positioned generally in front of gauge wheels 88 and opening disks 90. The residue management system 86 includes residue managers 87 (e.g., rolling tines, blades, or disks) that clear the surface of the field 14 of residue (e.g., clods, debris, etc.) as the row unit 22 moves over the surface. The residue managers 87 are coupled to the row unit 22 via linkages in front of and adjacent to the gauge wheels 88 (e.g., generally below the linkage assembly 80). As the row unit 22 travels across the field 14, the residue managers 87 may rotate and conform the soil of the field 14 in a manner that enables the opening disks 90 to create the trench 94. For example, the residue managers 87 may break apart clods of the soil, move residue and/or debris out of a pathway of the row unit 22, level out the soil, or a combination thereof. In certain embodiments, the residue management system 86 may include other mechanisms in addition to or instead of the residue managers 87 that engage the soil and manage the residue.

As illustrated, the opening system 28 of the row unit 22 includes the gauge wheels 88 and the opening disks 90. Each of the two opening disks 90 is coupled to a respective gauge wheel 88. The gauge wheels 88 and the opening disks 90 are coupled to the chassis 82 via opening disk linkage 92. The opening disks 90 penetrate a top surface of the field 14 to form a trench 94 along the row of the row unit 22. The gauge wheels 88 rotate along the top surface of the field 14 beside the row and provide a reference level from which the opening disks 90 form the trench 94. For example, the opening disks 90 and/or the gauge wheels 88 may be vertically adjustable to enable the operator to set a desired depth of the trench 94. As the opening disks 90 penetrate the field 14, the trench 94 is formed in the soil.

As described above, the row unit 22 and the draft load control system include the down force system 68, which includes the opening system actuator 70 and the closing system actuator 71. The opening system actuator 70 provides the down force to the opening system 28 generally along the vertical axis 45 to cause the opening system 28 to form the trench 94 in the field 14. As such, the down force applied by the down force system 68 is directed generally toward soil engaged by the opening system 28. The down force provided by the opening system actuator 70 is applied via the linkage assembly 80 and the chassis 82 to the opening system 28 and may be adjustable based on certain factors associated with operation of the row unit 22 (e.g., based on the draft load on the row unit 22). Further, the opening system actuator 70 may be controlled to control/adjust a depth of the gauge wheels 88 and the opening disks 90 with respect to the surface of the field 14 and/or with respect to other portions of the row unit 22 (e.g., the chassis 82).

As the row unit 22 travels across the field in the direction 24 and as the opening system actuator 70 applies the down force to the opening system 28, the row unit 22 will experience an opening system draft load 95 at the opening disk linkage 92 generally along the longitudinal axis 44 (e.g., a longitudinal load). As illustrated, the opening system draft load sensor 33 is disposed on the opening disk linkage 92 and measures the opening system draft load 95. In certain embodiments, the opening system draft load sensor 33 may be incorporated within the opening disk linkage 92. The opening system draft load sensor 33 may output sensor signal(s) indicative of the opening system draft load 95 to the controller of the draft load control system. Based on the opening system draft load 95 (e.g., based on the opening system draft load 95 exceeding the threshold range), the controller may notify the user of the opening system draft load 95 and/or may adjust the down force applied by the opening system actuator 70. In certain embodiments, the controller may adjust the down force applied by the closing system actuator 71 to the closing system 30 based on the opening system draft load 95.

As illustrated, the closing system 30 of the row unit 22 includes the closing disks 96 and the press wheel 98. The closing disks 96 and the press wheel 98 may form a two-stage closing system of the row unit 22. In the illustrated embodiment, the closing disks 96 include a closing disk 96 disposed on each side of the trench 94. The pair of closing disks 96 may be axially offset by a fixed or an adjustment spacing. Further, to at least partially close the trench 94, a first closing disk 96 fractures and/or mixes the soil from a first side of the trench 94 into the trench 94, and then a second closing disk 96 fractures and/or mixes the soil from a second side of the trench 94 into the trench 94. Additionally, each closing disk 96 may be disposed at an angle relative to the trench 94. For example, the top ends of the closing disks 96 may be closer than the bottom ends of the closing disks 96. In some embodiments, the row unit 22 may include a single closing disk 96 that moves the soil into the trench 94. The closing disks 96 are coupled to the row unit 22 (e.g., to the chassis 82) via a closing disk linkage 100.

The press wheel 98 is configured to compact the soil in the trench 94 and/or to further fill the trench 94 with the soil. The press wheel 98 is axially wider than the trench 94 such that the press wheel 98 contacts the first side of the trench 94 and the second side of the trench 94. As the press wheel 98 rolls over the trench 94, the press wheel 98 applies a downward force to the field 14 that compacts the soil. For example, to properly close the trench 94, the press wheel 98 compacts the soil in the trench 94 to be at generally the original ground level (e.g., the level of the soil on the first side and the second side of the trench 94). The press wheel 98 is coupled to the row unit 22 (e.g., to the chassis 82) via a press wheel linkage 101.

In certain embodiments, the closing disks 96 or the press wheel 98 may be omitted from the closing system 30 such that the closing system 30 of the row unit 22 includes a single stage (e.g., only the closing disks 96 or only the press wheel 98). Additionally, in certain embodiments, the closing system 30 may include a single closing disk 96 and/or the press wheel 98. Further, some embodiments of the single stage closing system may include closing disks disposed at angles other than those described above for the closing disks 96.

In some embodiments, the closing system may include closing wheels that roll generally along the surface of the soil to at least partially close the trench by pushing soil into the trench. For example, the bottom ends of the closing wheels may be closer than the top ends of the closing wheels such that the closing wheels from a "V-press" (e.g., the closing wheels may form the point of the "V" at the bottom ends of the wheels). The closer distance between the bottom ends of the closing wheels may enable the closing wheels to close the trench (e.g., to move the soil into the trench from the sides of the trench). The closing wheels may be coupled to the chassis of the row unit by a closing wheel linkage, and the closing system actuator may be coupled to the closing wheel linkage or directly to the closing wheels. The draft load control system may adjust a down force applied by the closing system actuator to the closing disk linkage and the closing wheels based on the detected draft load on the row unit (e.g., the detected draft load on the closing disk linkage and/or a detected draft load on the opening system linkage).

The closing system actuator 71 provides the down force to the closing system 30 (e.g., to the closing disks 96) generally along the vertical axis 45 to cause the closing system 30 to close the trench 94 in the field 14. As illustrated, the closing system actuator 71 is coupled to the closing disks 96 via the closing disk linkage 100. The down force provided by the closing system actuator 71 is applied via the closing disk linkage 100 to the closing disks 96 and may be adjustable based on certain factors associated with operation of the row unit 22 (e.g., based on a draft load of the row unit 22). As such, the down force applied by the down force system 68 is directed generally toward soil engaged by the closing system 30. As illustrated, the opening system actuator 70 and the closing system actuator 71 include pneumatic cylinders configured to apply the down forces to the opening system 28 and the closing system 30, respectively. In certain embodiments, the opening system actuator and/or the closing system actuator may be other types of actuators (e.g., hydraulic cylinders, springs, hydropneumatic cylinders, etc.).

As the row unit 22 travels across the field in the direction 24 and as the closing system actuator 71 applies the down force to the closing disks 96, the row unit 22 will experience a closing system draft load 102 at the closing disk linkage 100 generally along the longitudinal axis 44 (e.g., a longitudinal load). As illustrated, the closing system draft load sensor 34 is disposed on the closing system disk 100 and measures the closing system draft load 102. In certain embodiments, the closing system draft load sensor 34 may be incorporated within the closing system disk 100. The closing system draft load sensor 34 may output sensor signal(s) indicative of the closing system draft load 102 to the controller of the draft load control system. Based on the closing system draft load 102 (e.g., based on the closing system draft load 102 exceeding the threshold range), the controller may notify the user of the closing system draft load 102 and/or may adjust the down force applied by the closing system actuator 71. In certain embodiments, the controller may adjust the down force applied by the opening system actuator 70 to the opening system 28 based on the closing system draft load 102. As such, the pressure applied by the closing system actuator 71 and/or the depth of the closing disks 96 with respect to the surface of the field 14 may be controlled/adjusted via the closing system actuator 71 based on the closing system draft load 102, among other factors.

As illustrated, the row unit 22 and the draft load control system also include the soil moisture sensor 72 and the orientation sensor 73. The soil moisture sensor 72 is disposed on the closing disk 96. The soil moisture sensor 72 detects the moisture of the soil within the field 14 and outputs the signal indicative of the moisture to the controller of the draft load control system. In certain embodiments, the soil moisture sensor 72 may be located elsewhere on the row unit 22 and/or on the agricultural implement. The orientation sensor 73 is disposed on the closing disk linkage 100. The orientation sensor 73 detects the orientation of the row unit 22 or of the ground engaging component of the row unit 22 and outputs the sensor signal indicative of the orientation to the controller of the draft load control system. In certain embodiments, the orientation sensor 73 may be disposed elsewhere on the row unit 22 and/or on the agricultural implement and may detect an orientation of the agricultural implement. Based on the soil moisture detected by the soil moisture sensor 72, the orientation detected by the orientation sensor 73, the opening system draft load 95 detected by the opening system draft load sensor 33, the closing system draft load 102 detected by the closing system draft load sensor 34, or a combination thereof, the controller of the draft load control system may perform the monitoring operation (e.g., inform the user of the detected measurements) and/or the control operation (e.g., adjust the down force(s) applied by the down force system). Further, the detected moisture and/or the detected orientation at the ground engaging component (e.g., at the opening disks 90 or at the closing disks 96) may be used to determine the threshold range of the draft load at the ground engaging component.

Figure 4:
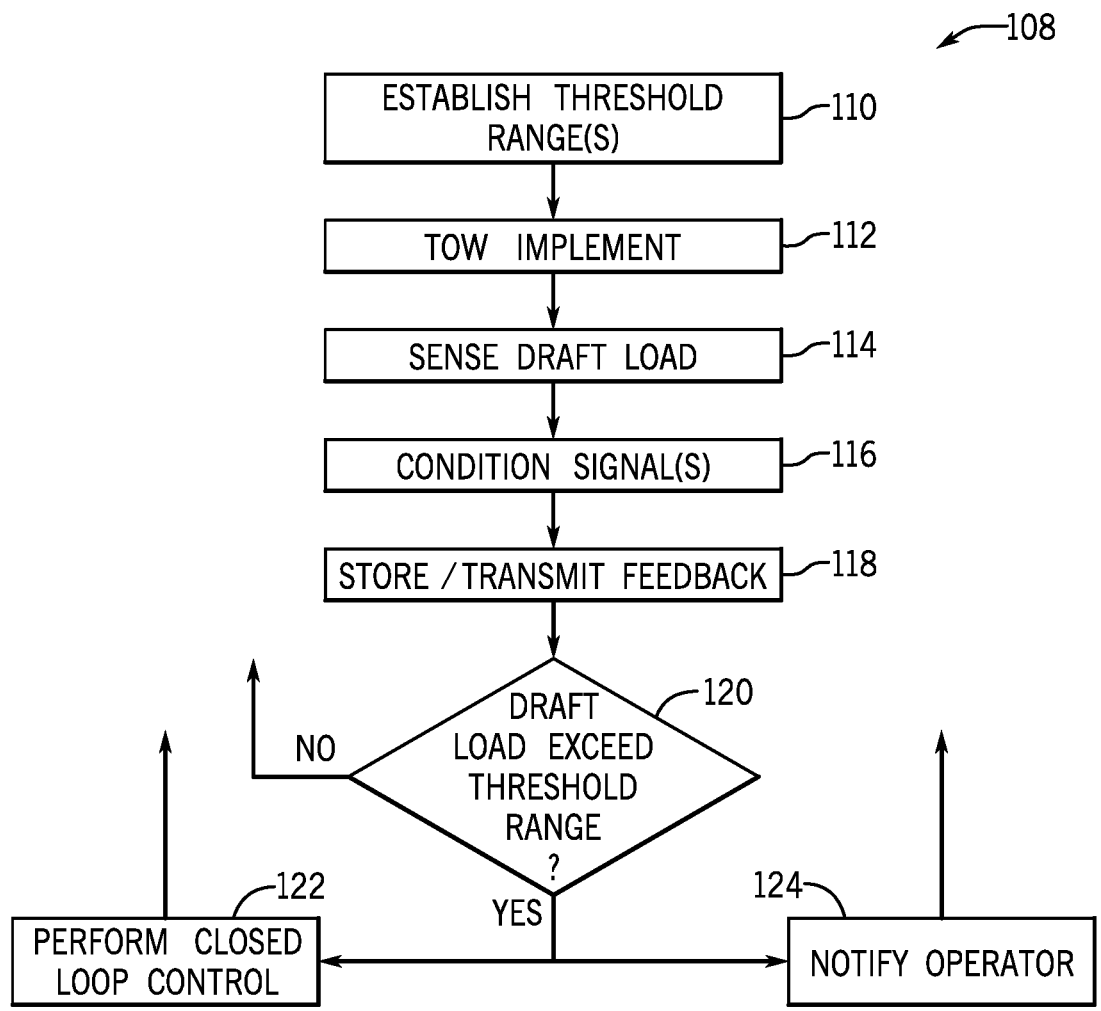
FIG. 4 is a flowchart of a method for the draft load control system of FIG. 1, in accordance with an aspect of the present disclosure.

FIG. 4 is a flowchart of a method 108 for the draft load control system 10 of FIG. 1. The method 108 begins at block 130, where threshold range(s) are established. The threshold range(s) may be used by the controller to perform certain control operations. The threshold range(s) may be provided/selected by the operator and/or may be automatically be determined by the controller. For example, a threshold range may depend on an orientation of the ground engaging component, soil moisture, a type of soil, other soil conditions and properties, weather, a type of the agricultural product applied by the row unit, and other conditions. The threshold range(s) are compared by the controller to measured values (e.g., the draft load(s), the soil moisture, the orientation data) detected by the sensors of the draft load control system to determine whether certain control operations should be performed by the draft load control system or whether certain measurements/alerts should be reported to the operator.

At block 112, the work vehicle tows the agricultural implement through the field. As the work vehicle tows the agricultural implement, the row units of the agricultural implement engage the soil of the field. For example, the opening system of the row units engage the soil to open the trenches in the field, the row units deposit the seeds into the trenches, and the closing system push the soil into the trenches to close the trenches. As the work vehicles tows the agricultural implement, the row units of the agricultural implement may experience a draft load.

At block 114, the draft load control system detects the draft load on the row unit. For example, the draft load control system may detect the opening system draft load via the opening system draft load sensor and/or may detect the closing system draft load via the closing system draft load sensor. Additionally or alternatively, the soil moisture sensor may detect the soil moisture and/or the orientation sensor may detect the orientation of the row unit. The detection by the sensors may be at periodic time intervals, based on a user input, in response to a triggering event (e.g., a sensed condition), or a combination thereof. The sensors of the draft load control system may output signals to the controller indicative of the measurements. At block 116, the signals output by the sensors are conditioned. For example, a low pass filter may condition the signals for receipt by the controller of the draft load control system. At block 118, the signals are received at the controller and the values indicated by the signals are stored the memory of the controller. The values are also transmitted to the processor of the controller.

At block 120, the controller determines whether the draft load exceeds the threshold range. For example, the controller may compare the draft load, as received from the draft load sensor(s), to the threshold range previously established at block 110. If the controller determines that the draft load does not exceed the threshold range, the method 108 returns to a previous block (i.e., to one of the blocks 110-114). If the controller determines that the draft load exceeds the threshold range, the method 108 proceeds to blocks 120 and 122. At block 120, the controller performs a control operation (e.g., performs closed loop control of certain components of the respective row unit). For example, the controller may output control signals to the down force system of the respective row unit to adjust the down force applied to the opening system and/or the down force applied to the closing system. At block 122, in addition to or independent of block 120, the draft load control system notifies the operator of the draft load and/or of the draft load exceeding the threshold range. For example, the controller may output signals to the user interface to provide user-detectable alerts for viewing by the operator. After completing the blocks 120 and/or 122, the method 108 may return to a previous block (i.e., to one of the blocks 110-114).

In certain embodiments, the draft load control system described herein may enable the work vehicle, the agricultural implement, the operator, a combination thereof, to improve the closure of the trench formed by the row unit and/or other operating characteristics of the row unit. For example, as the row unit operates to form the trench, deposit the agricultural product into the trench, and close the trench, the draft load control system may determine the draft load experienced by the row unit. The draft load control system may compare the draft load to the threshold range to determine whether the draft load exceeds the threshold range. In response to determining that the draft load exceeds the threshold range, the draft load control system may notify the operator of the draft load exceeding the threshold range and/or may perform a closed loop control operation at the respective row unit to improve the draft load. As described herein, the draft load on the row unit may provide an indication of the performance of the opening system and/or the closing system, among other operating characteristics. As such, the ability of the draft load control system to determine the draft load, to notify the operator, and to perform the closed loop control operation enables the draft load control system to improve closure of the trench and general operation of the row unit. The quality of the closure of the trench over the agricultural product may affect crop yields, an amount of the agricultural product that is applied, and other factors. Improved crop yields may provide increased profits for the operator of the draft load control system.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A draft load control system for an agricultural implement, comprising:
 a row unit;
 a down force system configured to apply a force within or to the row unit;
 a draft load sensor disposed on the row unit and configured to generate a first sensor signal indicative of a draft load on the row unit; and
 a controller comprising a memory and a processor, wherein the controller is configured to:
  receive the first sensor signal from the draft load sensor indicative of the draft load on the row unit;
  determine the draft load on the row unit based on the first sensor signal; and
  in response to the draft load exceeding a threshold range, perform a first control operation.

2. The draft load control system of claim 1, wherein the control operation comprises outputting a control signal to the down force system indicative of an adjustment to the force applied within or to the row unit.

3. The draft load control system of claim 1, wherein the row unit comprises a closing system, and wherein the down force system is configured to apply the force within or to the row unit in a direction generally toward soil engaged by the closing system.

4. The draft load control system of claim 3, wherein the down force system comprises a closing system actuator coupled to the closing system.

5. The draft load control system of claim 4, wherein the control operation comprises outputting a control signal to the down force system to cause the closing system actuator to increase or decrease the force on the closing system.

6. The draft load control system of claim 1, wherein the controller is configured to perform a monitoring operation in response to the draft load exceeding the threshold range, and wherein the monitoring operation comprises outputting a monitoring signal to a user interface indicative of a user-detectable indication of the draft load exceeding the threshold range.

7. The draft load control system of claim 1, wherein the draft load comprises a generally longitudinal load on the row unit.

8. The draft load control system of claim 1, comprising a soil moisture sensor configured to detect a moisture of soil and output a second sensor signal indicative of the moisture of the soil, wherein the controller is configured to receive the second sensor signal and, in response to the moisture exceeding a threshold moisture range, perform a second control operation.

9. The draft load control system of claim 8, wherein the controller is configured to determine the threshold range based on one or more operator inputs, the moisture of the soil detected by the soil moisture sensor, an orientation of the row unit, or a combination thereof.

10. A draft load control system for an agricultural implement, comprising:
a row unit comprising a closing system and a down force system configured to apply a force to the closing system;
a draft load sensor disposed on the row unit and configured to generate a sensor signal indicative of a draft load on the row unit; and
a controller comprising a memory and a processor, wherein the controller is configured to:
receive the sensor signal from the draft load sensor indicative of the draft load on the row unit;
determine the draft load on the row unit based on the sensor signal; and
in response to the draft load exceeding a threshold range, output a control signal to the down force system indicative of an adjustment to the force applied by the down force system.

11. The draft load control system of claim 10, wherein the row unit comprises an opening system, and wherein the down force system comprises an opening system actuator configured to apply the force to the opening system and a closing system actuator configured to apply the force to the closing system.

12. The draft load control system of claim 10, wherein the draft load control system is configured to receive the sensor signal from the draft load sensor at periodic time intervals, based on an input to a user interface, in response to a sensed condition, or a combination thereof.

13. The draft load control system of claim 10, wherein the controller is configured to determine the threshold range based on a type of soil engaged by the row unit, a type of product deposited by the row unit, soil conditions, an orientation of the row unit, or a combination thereof.

14. The draft load control system of claim 10, wherein the threshold range is received from a user interface.

15. A draft load control system for an agricultural implement, comprising:
a row unit comprising a closing system and a down force system configured to apply a force to the closing system;
a draft load sensor disposed on the closing system and configured to generate a first sensor signal indicative of a draft load on the closing system; and
a controller comprising a memory and a processor, wherein the controller is configured to:
receive the first sensor signal from the draft load sensor indicative of the draft load on the closing system;
determine the draft load on the closing system based on the first sensor signal; and
in response to the draft load exceeding a threshold range, output a control signal to a down force system indicative of an adjustment to a force applied by the down force system to the closing system.

16. The draft load control system of claim 15, wherein the closing system comprises at least one closing disk and a closing disk linkage coupling the at least one closing disk to a chassis of the row unit, and the draft load sensor is disposed on the closing disk linkage.

17. The draft load control system of claim 16, wherein the draft load sensor comprises a strain gauge disposed on the closing disk linkage.

18. The draft load control system of claim 15, comprising a soil moisture sensor configured to detect a moisture of soil and output a second sensor signal indicative of the moisture of the soil, wherein the controller is configured to receive the second sensor signal and, in response to the moisture exceeding a threshold moisture range, output the control signal to the down force system indicative of the adjustment to the force applied by the down force system to the closing system.

19. The draft load control system of claim 15, wherein the row unit comprises an opening system, and wherein the opening system comprises at least one opening disk, at least one gauge wheel, and at least one opening disk linkage.

20. The draft load control system of claim 19, wherein the draft load sensor comprises a strain gauge disposed on the at least one opening disk linkage.

\* \* \* \* \*